Patented Feb. 16, 1954

2,669,564

UNITED STATES PATENT OFFICE 2,669,564

TERTIARY-AMINOALKYL 4-AMINO-2-ALKOXY - THIOLBENZOATES AND THEIR PREPARATION

Raymond O. Clinton, North Greenbush, and Stanley C. Laskowski, Menands, N. Y., assignors to Sterling Drug Inc., New York, N. Y., a corporation of Delaware No Drawing. Application March 17, 1951, Serial No. 216,272

30 Claims. (Cl. 260—293.4)

This invention relates to tertiary-aminoalkyl 4-amino-2-alkoxythiolbenzoates and to their preparation.

The compounds of our invention have the general formula

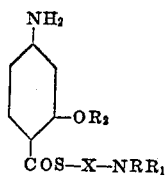

where X is a lower alkylene radical having two to four carbon atoms, $NRR_1$ is a lower aliphatic or aliphatic-like tertiary-amino radical and $R_2$ is a lower alkyl radical having one to six carbon atoms.

These esters of our invention are highly potent local anesthetics, possessing the distinct advantages of markedly greater activity and considerably lesser relative irritancy as compared to isomeric thiol esters wherein the nuclear amino (—$NH_2$) and alkoxy substituents (—$OR_2$) are in the 3- and 4-positions, respectively, of the benzene nucleus.

In the above general formula, the lower alkylene radical designated as X has two to four carbon atoms and has its two free valence bonds on different carbon atoms. Thus, X includes such examples as —$CH_2CH_2$—, —$CH_2CH_2CH_2$—,

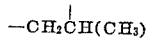

—$CH_2CH_2CH_2CH_2$—, —$CH_2CH(CH_3)CH_2$—, and the like. The lower aliphatic or aliphatic-like tertiary-amino radical shown above as $NRR_1$ comprehends lower dialkylamino radicals where R and $R_1$ are lower alkyl groups, alike or different, and each alkyl group having one to six carbon atoms, such dialkylamino radicals including dimethylamino, diethylamino, ethylmethylamino, diisopropylamino, ethyl-n-propylamino, di-n-butylamino, di-n-hexylamino, and the like. Further, the tertiary-amino radical designated as $NRR_1$ encompasses those aliphatic-like radicals where R and $R_1$ are joined directly or through an oxygen atom to form saturated N-heteromonocyclic radicals having five to six ring atoms, illustrated by examples such as 1-piperidyl, 2-methyl-1-piperidyl, 3-ethyl-1-piperidyl, 4-methyl-1-piperidyl, 2,6-dimethyl-1-piperidyl, 1-pyrrolidyl, 2-methyl-1-pyrrolidyl, 2,5-dimethyl-1-pyrrolidyl, 4-morpholinyl, and the like.

The compounds of our invention were conveniently prepared from 4-nitro-2-(lower alkoxy)- benzoyl halides as shown in the following series of reactions wherein X, $NRR_1$ and $R_2$ have the meanings given hereinabove.

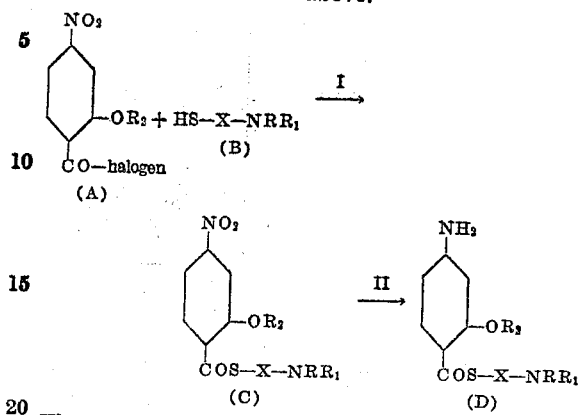

Thus, in step I a 4-nitro-2-(lower alkoxy)benzoyl halide (A) [preparation disclosed in our copending U. S. patent applications Serial Nos. 168,843 and 168,844] was treated with a tertiary-aminoalkanethiol (B) to yield a tertiary-aminoalkyl 4-nitro-2-(lower alkoxy)thiolbenzoate (C), which, in step II, was reduced to produce the corresponding tertiary-aminoalkyl 4-amino-2-(lower alkoxy)thiolbenzoate (D). A specific illustration of this series of reactions is the formation of 2-diethylaminoethyl 4-amino-2-ethoxythiolbenzoate by treating a 4-nitro-2-ethoxybenzoyl halide, preferably the chloride, with 2-diethylaminoethanethiol to form 2-diethylaminoethyl 4-nitro-2-ethoxythiolbenzoate and reducing the nitro group of said thiol ester to form the corresponding 2-diethylaminoethyl 4-amino-2-ethoxythiolbenzoate.

The reduction step II was carried out by reacting the tertiary-aminoalkyl 4-nitro-2-alkoxy-thiolbenzoates with reducing agents effective to reduce nitro groups to amino groups. This was carried out both by chemical methods and by catalytic hydrogenation. Suitable chemical reducing agents include iron and hydrochloric acid, ferrous sulfate and ammonia, tin and hydrochloride acid, sodium hydrosulfite, etc. In practicing our invention, we preferably used iron and hydrochloric acid. Catalysts suitable when catalytic hydrogenation is employed must be sulfur-insensitive catalysts, for instance, such catalysts as molybdenum sulfide, cobalt sulfide, and the like.

The tertiary-aminoalkyl 4-amino-2-(lower alkoxy)thiolbenzoates of our invention are therapeutically active whether employed in the form of their free bases or in the form of their salts with relatively non-toxic organic or inorganic acids. In practicing our invention we found it convenient to isolate our compounds in the form of their hydrochlorides or phosphates. However, other acid addition salts are within the scope of our invention, such additional salts including the hydrobromides, sulfates, citrates, sulfamates, tartrates, succinates, acetates, benzoates, oleates, and the like.

Specific embodiments of our invention are illustrated by the following examples.

EXAMPLE 1 a. *Tertiary-aminoalkyl 4-nitro-2-(lower alkoxy)-thiolbenzoates*

These substances were prepared by reacting a 4-nitro-2-(lower alkoxy)benzoyl halide, preferably the chloride, with a tertiary-aminoalkanethiol, as illustrated by the following preparation of 2-diethylaminoethyl 4-nitro-2-methoxythiolbenzoate: 4-nitro-2-methoxybenzoyl chloride was prepared in quantitative yield by refluxing a mixture of 98.5 g. of 4-nitro-2-methoxybenzoic acid and 295 g. of thionyl chloride for two and one-half hours, evaporating in vacuo, adding 200 ml. of dry benzene and again evaporating in vacuo. To a cooled solution of 63.9 g. of 4-nitro-2-methoxybenzoyl chloride dissolved in 400 ml. of dry benzene was added slowly, with stirring, 39.5 g. of 2-diethylaminoethanethiol dissolved in 50 ml. of dry benzene, and the resulting reaction mixture was heated to boiling, cooled and diluted with dry benzene to a total volume of one liter. The tan colored product that separated on cooling was filtered and recrystallized, with decolorization using activated carbon, from absolute ethanol-petroleum ether, thereby yielding the desired product, 2-diethylaminoethyl 4-nitro-2-methoxythiolbenzoate in the form of its hydrochloride. After being dried at 70° C. in vacuo, it melted at 146.4–147.9° C. (cor.).

In the preparation of the acid chlorides where the 2-alkoxy substituent is higher than ethoxy (e. g. 4-nitro-2-n-butoxybenzoyl chloride), the reaction is preferably run in the presence of pyridine as the hydrogen chloride acceptor to prevent cleavage of the alkoxy group. This procedure is illustrated as follows: To 1 mole of acid, e. g. 4-nitro-2-n-butoxybenzoic acid, and 1.2 mole of pure pyridine in 4 volumes of dry benzene was added 1.0 mole of thionyl chloride at 25° C., the mixture refluxed for about twenty minutes, cooled in ice, treated with stirring with 1.0 mole of the tertiary-aminoalkanethiol, e. g. 3-(1-piperidyl)-propanethiol, and the reaction mixture mixed well. The solvent was removed in vacuo and the residue dissolved in water. Excess ammonium hydroxide was added and the mixture extracted with toluene. The toluene solution was dried and the solvent removed in vacuo. More toluene was added and again evaporated in vacuo (this procedure was to remove pyridine), thereby leaving the pure base, e. g. 3-(1-piperidyl)propyl 4-nitro-2-n-butoxythiolbenzoate.

Additional tertiary-aminoalkyl 4-nitro-2-alkoxybenzoates, in the form of their hydrochlorides, prepared according to the above described procedures from the appropriate 4-nitro-2-alkoxybenzoyl chloride and tertiary-aminoalkanethiol are given in the table.

TABLE

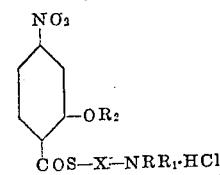

$COS-X-NRR_1 \cdot HCl$

| $R_2$ | X | $NRR_1$ | M. P.:/° C. (cor.) |
|---|---|---|---|
| $CH_3$ | $CH_2CH_2CH_2$ | 1-piperidyl | [1] 200.0–201.1 |
| $CH_3$ | $CH_2CH_2CH_2$ | $N(C_2H_5)_2$ | 157.0–158.0 |
| $CH_3$ | $CH_2CH_2CH_2CH_2$ | $N(C_2H_5)_2$ | 109.0–110.6 |
| $CH_3$ | $CH_2CH_2CH_2$ | $N(C_2H_5)_2$ | 117.2–118.8 |
| $CH_2CH_3$ | $CH_2CH_2$ | $N(C_2H_5)_2$ | 185.0–185.8 |
| $CH_2CH_2CH_3$ | $CH_2CH_2$ | 1-piperidyl | [2] 185.9–187.7 |
| $CH_2CH_2CH_3$ | $CH_2CH_2CH_2$ | 1-piperidyl | 196.6–198.0 |
| $CH_2CH_2CH_3$ | $CH_2CH_2$ | 2-$CH_3$-1-piperidyl | 210.0–211.5 |
| $CH_2CH_2CH_3$ | $CH_2CH_2$ | $N(C_2H_5)_2$ | 171.7–173.3 |
| $CH_2CH_2CH_2CH_3$ | $CH_2CH_2$ | 1-piperidyl | [3] 179.3–180.5 |
| $CH_2CH_2CH_2CH_3$ | $CH_2CH_2CH_2$ | 1-piperidyl | 170.0–171.0 |
| $CH_2CH_2CH_2CH_3$ | $CH_2CH_2$ | 2-$CH_3$-1-piperidyl | 165.0–165.9 |
| $CH_2CH(CH_3)_2$ | $CH_2CH_2$ | $N(C_2H_5)_2$ | 193.4–194.6 |
| $CH_2CH_2CH_2CH_2CH_2CH_3$ | $CH_2CH_2$ | $N(C_2H_5)_2$ | 115.4–116.6 |

[1] Thiol ester base melts at 60.1–61.2° C. (cor.).
[2] Thiol ester base melts at 65.6–67.7° C. (cor.).
[3] Thiol ester base melts at 55.3–57.2° C. (cor.).

Additional tertiary-aminoalkyl 4-nitro-2-(lower alkoxy) thiolbenzoates which can be prepared according to the foregoing procedure using the appropriate 4-nitro-2-alkoxybenzoyl chloride and tertiary-aminoalkanethiol include the following: 2-diethylaminoethyl 4-nitro-2-ethoxythiolbenzoate; 3-(1-pyrrolidyl) propyl 4-nitro-2-n-propoxythiolbenzoate; 2 - (2,5 - dimethylpyrrolidyl) ethyl 4-nitro-2-n-hexoxythiolbenzoate; 4 - dimethylaminobutyl 4-nitro-2-n-butoxythiolbenzoate; 2-(di-n-butylamino)ethyl 4-nitro-2-isoamoxythiolbenzoate; 2-(3-ethyl-1-piperidyl) ethyl 4-nitro-2-isobutoxythiolbenzoate; 3-(2-methyl-1- pyrrolidyl) propyl 4-nitro-2-(3-amoxy) thiolbenzoate; 3-dimethylamino - 2 - propyl 4-nitro-2-n-butoxythiolbenzoate; 2-(4-morpholinyl)ethyl 4-nitro-2-n-amoxythiolbenzoate; 2-(2-methyl - 1 - piperidyl)ethyl 4-nitro-2-ethoxythiolbenzoate; and 3-diethylaminopropyl 4-nitro-2-n-hexoxythiolbenzoate.

b. *2-diethylaminoethyl 4-amino-2-methoxythiolbenzoate*

To a hot stirred mixture of 75.0 g. of powdered iron (ferrum reductum), 1 ml. of concentrated hydrochloric acid and 600 ml. of 50% ethanol was added slowly 78.0 g. of 2-diethylaminoethyl 4-nitro-2-methoxythiolbenzoate hydrochloride over a period of about ten minutes. The resultant solution was heated with stirring for another twenty minutes, after which time an excess (about 35 g.) of sodium bicarbonate was added. The mixture was warmed and stirred for an additional twenty minutes, filtered through a filter aid and the insoluble material was washed well with hot absolute ethanol. The combined filtrates and washings were concentrated by distilling in vacuo, and the residue was cooled and extracted with ethyl acetate. The combined extracts were dried over anhydrous potassium carbonate or anhydrous calcium sulfate and the solvent removed by distilling in vacuo. The oily residue, which crystallized when cooled and triturated with a glass rod, was recrystallized, with decolorization using activated carbon, from ethyl acetate-n-hexane and dried in vacuo at 56° C., thereby yielding the product, 2-diethylaminoethyl 4-amino-2-methoxythiolbenzoate, in the form of the free base, M. P. 77.0–78.0° C. (cor.).

Anal.: Calcd. for $C_{14}H_{22}N_2O_2S$: N, 9.92. Found: N, 9.75.

The phosphate salt of this thiol ester was prepared by treating a solution of 2-diethylaminoethyl 4-amino-2-methoxythiolbenzoate in free base form in a suitable solvent, such as ethyl acetate, with an equivalent amount of 85% phosphoric acid, filtering the precipitated phosphate and recrystallizing the same from dilute ethanol. The resultant salt, 2-diethylaminoethyl 4-amino-2-methoxythiolbenzoate phosphate, melted at 188.2–190° C. (cor.) when dried at 100° C. in vacuo.

Anal.: Calcd. for $C_{14}H_{22}N_2O_2S \cdot H_3PO_4$: S, 8.42; N, 7.36; C, 44.19; H, 6.58. Found: S, 8.60; N, 7.35; C, 44.19; H, 6.44.

The dihydrochloride addition salt of this thiol ester can be prepared by dissolving a portion of said ester in free base form in a suitable solvent, such as ethyl acetate, and treating the solution with an excess of anhydrous ether containing 20% by weight of anhydrous hydrogen chloride. The gummy precipitate is separated from the supernatant liquid by decanting and is triturated with ethyl acetate. Again the ethyl acetate is decanted and the crude precipitate is recrystallized from absolute ethanol, absolute ethanol-ether or absolute ethanol-ethyl acetate and dried at 60° C. in vacuo. Thus obtained is 2-diethylaminoethyl 4-amino-2-methoxythiolbenzoate dihydrochloride.

The monohydrochloride salt of this thiol ester is prepared by dissolving the ester in free base form in a suitable solvent, such as ethyl acetate, treating the solution with an excess of anhydrous ether containing 20% by weight of anhydrous hydrogen chloride, triturating the gummy precipitate with ethyl acetate, as above, and dissolving the resulting crude dihydrochloride in a minimum quantity of hot absolute ethanol. To the solution is added a slight excess of the purified ester in free base form dissolved in a minimum quantity of hot absolute ethanol. The crystalline precipitate which separates on cooling is collected and washed with ethyl acetate. To ensure more complete precipitation, ethyl acetate can be added to the cooled mixture before filtering. Recrystallization of the precipitate from absolute ethanol or absolute ethanol-ethyl acetate yields, in purified form, 2-diethylaminoethyl 4-amino-2-methoxythiolbenzoate monohydrochloride.

Additional tertiary-aminoalkyl 4-amino-2-(lower alkoxy) thiolbenzoates can be prepared according to the foregoing procedure using the corresponding tertiary-aminoalkyl 4-nitro-2-(lower alkoxy) thiolbenzoate hydrochloride in place of 2-diethylaminoethyl 4-nitro-2-methoxythiolbenzoate hydrochloride. Thus, 2-diethylaminoethyl 4-amino-2-ethoxythiolbenzoate, 3-(1-pyrrolidyl)propyl 4-amino-2-n-propoxythiolbenzoate, 2-(2,5-dimethyl-1-pyrrolidyl)ethyl 4-amino-2-n-hexoxythiolbenzoate, 4-dimethylaminobutyl 4-amino-2-n-butoxythiolbenzoate, 2-(di-n-butylamino)ethyl 4-amino-2-isoamoxythiolbenzoate, 2-(3-ethyl-1-piperidyl)ethyl 4-amino-2-isobutoxythiolbenzoate, 3-(2-methyl-1-pyrrolidyl)propyl 4-amino-2-(3-amoxy)thiolbenzoate, 3-dimethylamino-2-propyl 4-amino-2-n-butoxythiolbenzoate, 2-(4-morpholinyl)ethyl 4-amino-2-n-amoxythiolbenzoate, 2-(2-methyl-1-piperidyl)ethyl 4-amino-2-ethoxythiolbenzoate and 3-diethylaminopropyl 4-amino-2-n-hexoxythiolbenzoate are obtained, respectively, from the hydrochlorides of 2-diethylaminoethyl 4-nitro-2-ethoxythiolbenzoate, 3-(1-pyrrolidyl)propyl 4-nitro-2-n-propoxythiolbenzoate, 2-(2,5-dimethyl-1-pyrrolidyl)ethyl 4-nitro-2-n-hexoxythiolbenzoate, 4-dimethylaminobutyl 4-nitro-2-n-butoxythiolbenzoate, 2-(di-n-butylamino)ethyl 4-nitro-2-isoamoxythiolbenzoate, 2-(3-ethyl-1-piperidyl)ethyl 4-nitro-2-isobutoxythiolbenzoate, 3-(2-methyl-1-pyrrolidyl)propyl 4-nitro-2-(3-amoxy)thiolbenzoate, 3-dimethylamino-2-propyl 4-nitro-2-n-butoxythiolbenzoate, 2-(4-morpholinyl)ethyl 4-nitro-2-n-amoxythiolbenzoate, 2-(2-methyl-1-piperidyl)ethyl 4-nitro-2-ethoxythiolbenzoate and 3-diethylaminopropyl 4-nitro-2-n-hexoxythiolbenzoate. Alternatively, the foregoing reactions can be run using said tertiary-aminoalkyl 4-nitro-2-alkoxythiolbenzoates in form of their free bases.

EXAMPLE 2

*3-diethylaminopropyl 4-amino-2-methoxythiolbenzoate*

When the procedure described above for Example 1b was followed but using 22.8 g. of powdered iron, 1 ml. of concentrated hydrochloric acid, 400 ml. of dilute ethanol (about 65%) and 24.6 g. of 3-diethylaminopropyl 4-nitro-2-methoxythiolbenzoate hydrochloride, there was obtained a quantitative yield of 3-diethylaminopropyl 4-amino-2-methoxythiolbenzoate. This thiol ester, in the form of its phosphate salt, melted at 208.0–208.9° C. (cor.).

Anal.: Calcd. for $C_{15}H_{24}N_2O_2S \cdot H_3PO_4$: S, 8.12; $H_3PO_4$, 24.85. Found: S, 8.24; $H_3PO_4$, 25.02.

EXAMPLE 3

*3-(1-piperidyl)propyl 4-amino-2-methoxythiolbenzoate*

This preparation was carried out according to the procedure described above for Example 1b using the following reactants: 19.7 g. of powdered iron, 1 ml. of concentrated hydrochloric acid, 400 ml. of 50% ethanol and 22.0 g. of 3-(1-piperidyl)propyl 4-nitro-2-methoxythiolbenzoate hydrochloride. There was thus obtained a quantitative yield of 3-(1-piperidyl)propyl 4-amino-2-methoxythiolbenzoate, which in the form of its phosphoric acid addition salt melted at 202.5–203.4° C. (cor.).

Anal.: Calcd. for $C_{16}H_{24}N_2O_2S \cdot H_3PO_4$: S, 7.88; $H_3PO_4$, 24.12. Found: S, 7.94; $H_3PO_4$, 24.20.

EXAMPLE 4

*4-diethylaminobutyl 4-amino-2-methoxythiolbenzoate*

When the procedure described above for Example 1b was followed but using 37.8 g. of powdered iron, 1 ml. of concentrated hydrochloric acid, 400 ml. of 50% ethanol and 42.5 g. of 4-diethylaminobutyl 4-nitro-2-methoxythiolbenzoate hydrochloride, there was obtained 31 g. of 4-diethylaminobutyl 4-amino-2-methoxythiolbenzoate. This thiol ester, in the form of its phosphoric acid addition salt, melted at 198.1–199.1° C. (cor.).

EXAMPLE 5

*2-diethylaminoethyl 4-amino-2-n-butoxythiolbenzoate*

This thiol ester was formed when the procedure described above for Example 1b was followed but using 47.4 g. of powdered iron, 1 ml. of concentrated hydrochloric acid, 500 ml. of 50% ethanol and 50.0 g. of 2-diethylaminoethyl 4-nitro-2-n-butoxythiolbenzoate. There was thus obtained 42 g. of 2-diethylaminoethyl 4-amino-2-n-butoxythiolbenzoate, which in the form of its monohydrochloride salt melted at 155.0–155.5° C. (cor.) when recrystallized, with decolorization using activated carbon, from absolute ethanol-n-pentane.

Anal.: Calcd. for $C_{17}H_{28}N_2O_2S \cdot HCl$: N, 7.76; Cl, 9.82. Found: N, 7.63; Cl, 9.55.

EXAMPLE 6

*2-diethylaminoethyl 4-amino-2-n-propoxythiolbenzoate*

When the procedure described above for Example 1b was followed but using 62.5 g. of powdered iron, 1 ml. of concentrated hydrochloric acid, 500 ml. of 50% ethanol and 64.0 g. of 2-diethylaminoethyl 4-nitro-2-n-propoxythiolbenzoate, there was obtained 40.0 g. of 2-diethylaminoethyl 4-amino-2-n-propoxythiolbenzoate. This thiol ester, in the form of its phosphate salt, melted at 150.4–151.8° C. (cor.).

Anal.: Calcd. for $C_{16}H_{26}N_2O_2S \cdot H_3PO_4$: N, 6.85; $H_3PO_4$, 24.00. Found: N, 6.72; $H_3PO_4$, 23.98.

EXAMPLE 7

*2-(1-piperidyl)ethyl 4-amino-2-n-propoxythiolbenzoate*

This thiol ester was prepared according to the procedure described above for Example 1b but using the following reactants: 26.5 g. of powdered iron, 1 ml. of concentrated hydrochloric acid, 350 ml. of 50% ethanol and 28.0 g. of 2-(1-piperidyl)ethyl 4-nitro-2-n-propoxythiolbenzoate. The yield of the 4-amino thiol ester was 24 g. This ester in the form of its monohydrochloride addition salt melted at 189.2–190.9° C. (cor.).

Anal.: Calcd. for $C_{17}H_{26}N_2O_2S \cdot HCl$: N, 7.80; Cl, 9.87; S, 8.93. Found: N, 7.54; Cl, 9.72; S, 9.05.

EXAMPLE 8

*3-diethylaminopropyl 4-amino-2-ethoxythiolbenzoate*

When the procedure described above for Example 1b was followed but using 35.3 g. of powdered iron, 1 ml. of concentrated hydrochloric acid, 400 ml. of dilute ethanol and 35.8 g. of 3-diethylaminopropyl 4-nitro-2-ethoxythiolbenzoate, there was obtained 30.8 g. of 3-diethylaminopropyl 4-amino-2-ethoxybenzoate. This thiol ester, in the form of its monohydrochloride salt, melted at 175.0–176.3° C. (cor.).

Anal.: Calcd. for $C_{16}H_{26}N_2O_2S \cdot HCl$: N, 8.07; Cl, 10.22. Found: N, 7.83; Cl, 10.40.

EXAMPLE 9

*2-(1-piperidyl)ethyl 4-amino-2-n-butoxythiolbenzoate*

When the procedure described above for Example 1b was followed but using 27.1 g. of powdered iron, 1 ml. of concentrated hydrochloric acid, 350 ml. of dilute ethanol and 29.5 g. of 2-(1-piperidyl)ethyl 4-nitro-2-n-butoxythiolbenzoate, there was obtained about 27 g. of 2-(1-piperidyl)ethyl 4-amino-2-n-butoxythiolbenzoate. This thiol ester, in the form of its monohydrochloride salt, melted at 172.3–173.9° C. (cor.).

Anal.: Calcd. for $C_{18}H_{28}N_2O_2S \cdot HCl$: N, 7.51; Cl, 9.50. Found: N, 7.38; Cl, 9.38.

EXAMPLE 10

*2-(2-methyl-1-piperidyl)ethyl 4-amino-2-n-butoxythiolbenzoate*

This preparation was carried out according to the procedure described above for Example 1b but using 31.4 g. of powdered iron, 1 ml. of concentrated hydrochloric acid, 400 ml. of dilute ethanol and 35.6 g. of 2-(2-methyl-1-piperidyl)ethyl 4-nitro-2-n-butoxythiolbenzoate. The product thus obtained was 2-(2-methyl-1-piperidyl)ethyl 4-amino-2-n-butoxythiolbenzoate (30 g.), which in the form of its hydrochloride salt melted at 191.2–192.3° C. (cor.).

Anal.: Calcd. for $C_{19}H_{30}N_2O_2S \cdot HCl$: N, 7.24; Cl, 9.16. Found: N, 7.28; Cl, 9.02.

EXAMPLE 11

*2-(2-methyl-1-piperidyl)ethyl 4-amino-2-n-propoxythiolbenzoate*

When the procedure described above for Example 1b was followed but using 32.6 g. of powdered iron, 1 ml. of concentrated hydrochloric acid, 400 ml. of dilute ethanol and 35.5 g. of 2-(2-methyl-1-piperidyl)ethyl 4-nitro-2-n-propoxythiolbenzoate, there was obtained 21.5 g. of 2-(2-methyl-1-piperidyl)ethyl 4-amino-2-n-propoxythiolbenzoate. This thiol ester, in the form of its dihydrochloride salt, sintered at 175–180° C. (cor.) and did not melt up to 300° C.

Anal.: Calcd. for $C_{18}H_{28}N_2O_2S \cdot 2HCl$: N, 6.84; Cl, 17.32. Found: N, 7.11; Cl, 17.61.

EXAMPLE 12

*3-(1-piperidyl)propyl 4-amino-2-n-propoxythiolbenzoate*

When the procedure described above for Example 1b was followed but using 22.0 g. of powdered iron, 1 ml. of concentrated hydrochloric acid, 400 ml. of dilute ethanol and 24.0 g. of 3-(1-piperidyl)propyl 4-nitro-2-n-propoxythiolbenzoate, there was obtained about 22 g. of 3-(1-piperidyl)propyl 4-amino-2-n-propoxythiolbenzoate. This thiol ester, in the form of its dihydrochloride salt, melted at 170.4–172.0° C. (cor.) with decomposition.

Anal.: Calcd. for $C_{18}H_{28}N_2O_2S \cdot 2HCl$: N, 6.84; S, 7.83. Found: N, 6.61; S, 7.77.

EXAMPLE 13

*3-(1-piperidyl)propyl 4-amino-2-n-butoxythiolbenzoate*

This preparation was carried out according to the procedure described above for Example 1b but using 18.5 g. of powdered iron, 1 ml. of concentrated hydrochloric acid, 400 ml. of dilute ethanol and 21.0 g. of 3-(1-piperidyl)propyl 4-nitro-2-n-butoxythiolbenzoate. There was thus obtained a quantitative yield of 3-(1-piperidyl)propyl 4-amino-2-n-butoxythiolbenzoate, which in the form of its monohydrochloride salt, melted at 155.0–157.0° C. (cor.).

Anal.: Calcd. for $C_{19}H_{30}N_2O_2S \cdot HCl$: C, 58.97; H, 8.07; Cl, 9.16. Found: C, 58.84; H, 8.10; Cl, 9.35.

EXAMPLE 14

2-diethylaminoethyl 4-amino-2-n-hexoxythiolbenzoate

This preparation was carried out according to the procedure described above for Example 1b but using 12.8 g. of powdered iron, 1 ml. of concentrated hydrochloric acid, 400 ml. of dilute ethanol and 16.0 g. of 2-diethylaminoethyl 4-nitro-2-n-hexoxythiolbenzoate hydrochloride. There was thus obtained a quantitative yield of 2-diethylaminoethyl 4-amino-2-n-hexoxythiolbenzoate, which in the form of its monohydrochloride salt melted at 110.2–111.6° C. (cor.).

Anal.: Calcd. for $C_{19}H_{32}N_2O_2S \cdot HCl$: N, 7.20; Cl, 9.11. Found: N, 7.02; Cl, 9.28.

EXAMPLE 15

2-diethylaminoethyl 4-amino-2-isobutoxy-thiolbenzoate

When the procedure described above for Example 1b was followed but using 16.3 g. of powdered iron, 1 ml. of concentrated hydrochloric acid, 400 ml. of dilute ethanol and 19.0 g. of 2-diethylaminoethyl 4-nitro-2-isobutoxythiolbenzoate hydrochloride, there was obtained a quantitative yield of 2-diethylaminoethyl 4-amino-2-isobutoxythiolbenzoate, which in the form of its monohydrochloride salt melted at 163.0–164.2° C. (cor.).

Anal.: Calcd. for $C_{17}H_{28}N_2O_2S \cdot HCl$: N, 7.76; Cl, 9.82. Found: N, 7.66; Cl, 9.61.

We claim:

1. A tertiary-aminoalkyl 4-amino-2-alkoxythiolbenzoate having the formula

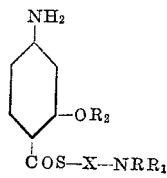

where X is a lower alkylene radical having two to four carbon atoms, R and $R_1$ are lower alkyl radicals which can be joined to form a saturated N-heteromonocyclic radical having five to six ring atoms and $R_2$ is a lower alkyl radical having one to six carbon atoms.

2. A compound according to claim 1 where $NRR_1$ is a saturated N-heteromonocyclic radical having five to six ring atoms.

3. A compound according to claim 1 where R and $R_1$ are each lower alkyl radicals having one to six carbon atoms.

4. A compound according to claim 1 where $NRR_1$ is a 1-piperidyl radical.

5. A compound according to claim 1 where $NRR_1$ is a diethylamino radical.

6. A compound according to claim 1 where $NRR_1$ is a 2-methyl-1-piperidyl radical.

7. A process of preparing a tertiary-aminoalkyl 4-amino-2-alkoxythiolbenzoate having the formula

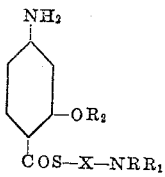

where X is a lower alkylene radical having two to four carbon atoms, R and $R_1$ are lower alkyl radicals which can be joined to form a saturated N-heteromonocyclic radical having five to six ring atoms and $R_2$ is a lower alkyl radical having one to six carbon atoms, which comprises treating a 4-nitro-2-(lower alkoxy)benzoyl halide with a tertiary-aminoalkanethiol having the formula $HS—X—NRR_1$ and reacting the resulting tertiary-aminoalkyl 4-nitro-2-(lower alkoxy)thiolbenzoate with a reducing agent effective to reduce nitro groups to amino groups.

8. A process according to claim 7 where $NRR_1$ is a saturated N-heteromonocyclic radical having five to six ring atoms.

9. A process according to claim 7 where R and $R_1$ are each lower alkyl radicals having one to six carbon atoms.

10. A process according to claim 7 where $NRR_1$ is a 1-piperidyl radical.

11. A process according to claim 7 where $NRR_1$ is a diethylamino radical.

12. A process according to claim 7 where $NRR_1$ is a 2-methyl-1-piperidyl radical.

13. In a process for the preparation of a tertiary-aminoalkyl 4-amino-2-alkoxythiolbenzoate having the formula

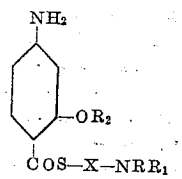

where X is a lower alkylene radical having two to four carbon atoms, $NRR_1$ is a saturated N-heteromonocyclic radical having five to six ring atoms and $R_2$ is a lower alkyl radical having one to six carbon atoms, the step which comprises reacting a tertiary-aminoalkyl 4-nitro-2-(lower alkoxy)thiolbenzoate with a reducing agent effective to reduce nitro groups to amino groups.

14. In a process for the preparation of a tertiary-aminoalkyl 4-amino-2-alkoxythiolbenzoate having the formula

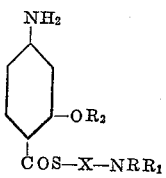

where X is a lower alkylene radical having two to four carbon atoms and R, $R_1$ and $R_2$ are each lower alkyl radicals having one to six carbon atoms, the step which comprises reacting a dialkylaminoalkyl 4-nitro-2-(lower alkoxy)thiolbenzoate with a reducing agent effective to reduce nitro groups to amino groups.

15. A 2-diethylaminoethyl 4-amino-2-(lower alkoxy)thiolbenzoate where the lower alkoxy radical has one to six carbon atoms.

16. 2-diethylaminoethyl 4-amino-2-n-propoxythiolbenzoate.

17. 2-diethylaminoethyl 4-amino-2-n-butoxythiolbenzoate.

18. 2-diethylaminoethyl 4-amino-2-n-hexoxythiolbenzoate.

19. A 2-(1-piperidyl)ethyl 4-amino-2-(lower alkoxy)thiolbenzoate where the lower alkoxy radical has one to six carbon atoms.

20. 2-(1-piperidyl)ethyl 4-amino-2-n-butoxythiolbenzoate.

21. A 2-(2-methyl-1-piperidyl)ethyl 4-amino-2-(lower alkoxy)thiolbenzoate where the lower alkoxy radical has one to six carbon atoms.

22. 2-(2-methyl-1-piperidyl)ethyl 4-amino-2-n-butoxythiolbenzoate.

23. In a process for the preparation of a 2-diethylaminoethyl 4-amino-2-(lower alkoxy)-thiolbenzoate where the lower alkoxy radical has one to six carbon atoms, the step which comprises reacting a 2-diethylaminoethyl 4-nitro-2-(lower alkoxy)thiolbenzoate with a reducing agent effective to reduce nitro groups to amino groups.

24. In a process for the preparation of a 2-(1-piperidyl)ethyl 4-amino-2-(lower alkoxy)thiolbenzoate where the lower alkoxy radical has one to six carbon atoms, the step which comprises reacting a 2-(1-piperidyl)ethyl 4-nitro-2-(lower alkoxy)thiolbenzoate with a reducing agent effective to reduce nitro groups to amino groups.

25. In a process for the preparation of a 2-(2-methyl-1-piperidyl)ethyl 4-amino-2-(lower alkoxy)thiolbenzoate where the lower alkoxy radical has one to six carbon atoms, the step which comprises reacting a 2-(2-methyl-1-piperidyl)ethyl 4-nitro-2-(lower alkoxy)thiolbenzoate with a reducing agent effective to reduce nitro groups to amino groups.

26. In a process for the preparation of 2-diethylaminoethyl 4-amino-2-n-butoxythiolbenzoate the step which comprises reacting 2-diethylaminoethyl 4 - nitro - 2 - n - butoxythiolbenzoate with a reducing agent effective to reduce nitro groups to amino groups.

27. In a process for the preparation of 2-diethylaminoethyl 4-amino-2-n-propoxythiolbenzoate the step which comprises reacting 2-diethylaminoethyl 4-nitro-2-n-propoxythiolbenzoate with a reducing agent effective to reduce nitro groups to amino groups.

28. In a process for the preparation of 2-diethylaminoethyl 4-amino-2-n-hexoxythiolbenzoate the step which comprises reacting 2-diethylaminoethyl 4-nitro-2-n-hexoxythiolbenzoate with a reducing agent effective to reduce nitro groups to amino groups.

29. In a process for the preparation of 2-(1-piperidyl)ethyl 4-amino-2-n-butoxythiolbenzoate the step which comprises reacting 2-(1-piperidyl)ethyl 4-nitro-2-n-butoxythiolbenzoate with a reducing agent effective to reduce nitro groups to amino groups.

30. In a process for the preparation of 2-(2-methyl-1-piperidyl)ethyl 4-amino-2-n-butoxythiolbenzoate the step which comprises reacting 2 - (2 - methyl - 1 - piperidyl)ethyl 4 - nitro - 2 - n-butoxythiolbenzoate with a reducing agent effective to reduce nitro groups to amino groups.

RAYMOND O. CLINTON.
STANLEY C. LASKOWSKI.

References Cited in the file of this patent

UNITED STATES PATENTS

| Number | Name | Date |
|---|---|---|
| 2,342,142 | Harris et al. | Feb. 22, 1944 |

OTHER REFERENCES

Nolle, Chem. Abstracts, vol. 34, page 3820 (1940).

Drain et al., Chem. Abstracts, vol. 44, page 1199 (1950).